(12) United States Patent
Klotblixt

(10) Patent No.: US 11,548,123 B2
(45) Date of Patent: Jan. 10, 2023

(54) ELECTRIC PULSE TOOL

(71) Applicant: ATLAS COPCO INDUSTRIAL TECHNIQUE AB, Stockholm (SE)

(72) Inventor: Adam Klotblixt, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 458 days.

(21) Appl. No.: 16/606,709

(22) PCT Filed: Apr. 5, 2018

(86) PCT No.: PCT/EP2018/058663
§ 371 (c)(1),
(2) Date: Oct. 18, 2019

(87) PCT Pub. No.: WO2018/192776
PCT Pub. Date: Oct. 25, 2018

(65) Prior Publication Data
US 2020/0130151 A1    Apr. 30, 2020

(30) Foreign Application Priority Data

Apr. 19, 2017  (SE) .................................... 1730109-4

(51) Int. Cl.
*B25B 21/02* (2006.01)
*B25B 23/147* (2006.01)
(Continued)

(52) U.S. Cl.
CPC .......... *B25B 21/02* (2013.01); *B25B 23/1475* (2013.01); *H02K 7/145* (2013.01); *H02P 8/10* (2013.01)

(58) Field of Classification Search
CPC .... B25B 21/02; B25B 23/1475; H02K 7/145; H02P 8/10
(Continued)

(56) References Cited

U.S. PATENT DOCUMENTS 3,564,372 A * 2/1971 Vogelsberg et al. .... H02P 25/14
                                              318/434
4,095,325 A * 6/1978 Hashimoto ........... B25B 23/147
                                              29/446
(Continued)

FOREIGN PATENT DOCUMENTS

| SE | 1551333 A1 | 4/2017 | |
|---|---|---|---|
| WO | 9962675 A1 | 12/1999 | |
| WO | WO-9962675 A1 * | 12/1999 | ............. B25B 21/00 |

OTHER PUBLICATIONS

International Preliminary Report on Patentability (IPRP) dated Mar. 21, 2019 issued in International Application No. PCT/EP2018/058663.

(Continued)

*Primary Examiner* — Thomas M Wittenschlaeger
*Assistant Examiner* — David G Shutty
(74) *Attorney, Agent, or Firm* — Holtz, Holtz & Volek PC

(57) ABSTRACT

An electric pulse tool is configured to deliver torque in pulses on an output shaft thereof and includes an electric motor to drive the output shaft. The electric pulse tool is configured to, for each period, provide a current pulse to the electric motor during a current-on time interval, pause a current feed to the electric motor after the current-on time interval until an end of a torque pulse, determine a width of the torque pulse, and continue pausing the current feed to the electric motor during a pause interval from the end of the torque pulse. The pause interval is determined based on the width of the torque pulse such that a wider torque pulse results in a wider pause interval and a narrower torque pulse results in a shorter pause interval.

17 Claims, 4 Drawing Sheets

(51) Int. Cl.
*H02K 7/14* (2006.01)
*H02P 8/10* (2006.01)

(58) Field of Classification Search
USPC .......................................................... 173/176
See application file for complete search history.

(56) References Cited

U.S. PATENT DOCUMENTS

| | | | | |
|---|---|---|---|---|
| 5,440,215 | A * | 8/1995 | Gilmore | B25F 5/001 |
| | | | | 388/930 |
| 6,479,958 | B1 * | 11/2002 | Thompson | B25F 5/00 |
| | | | | 388/937 |
| 6,680,595 | B2 * | 1/2004 | Ito | B25B 23/1475 |
| | | | | 173/4 |
| 7,410,006 | B2 * | 8/2008 | Zhang | B25B 21/00 |
| | | | | 173/179 |
| 7,770,658 | B2 * | 9/2010 | Ito | H02P 25/14 |
| | | | | 318/434 |
| 10,637,379 | B2 * | 4/2020 | Najjar | H02P 6/28 |
| 10,882,166 | B2 * | 1/2021 | Asplund | B25B 23/1475 |
| 2002/0134172 | A1 * | 9/2002 | Yamada | B25B 23/1453 |
| | | | | 73/862.21 |
| 2003/0090227 | A1 | 5/2003 | Ito | |
| 2013/0008679 | A1 * | 1/2013 | Nishikawa | B25B 21/02 |
| | | | | 173/93 |

OTHER PUBLICATIONS

International Search Report (ISR) dated Jul. 23, 2018 issued in International Application No. PCT/EP2018/0058663.

* cited by examiner

ELECTRIC PULSE TOOL

TECHNICAL FIELD

The invention relates to an electric pulse tool and a method in an electric pulse tool. In particular the invention relates to an electric pulse tool for performing tightening operations where torque is delivered in pulses to e.g. tighten and/or loosen screw joints.

BACKGROUND

Electric power tools for fastening bolts, screws and nuts are used in many different applications. In some of these applications it is desired or even required to be able to control the clamping force or at least an associated torque. Such electric power tools are typically controlled to rotate an output shaft of the electric power tools such that the torque is measured. When the torque reaches a predetermined value the electric power tool is controlled to stop the rotation of the output shaft. This can for example be accomplished by cutting the power to the tool or a clutch can be slid.

A problem encountered when operating electric power tools, in particular a handheld electric power tools, is that the operator is subject to a reaction force. One way to reduce the reaction force transferred to the operator is to use a pulsed electric motor that is fed with a series of energy pulses driving the electric motor in a pulsed manner. The energy can typically be supplied as current pulses. Hereby the reaction force that the operator needs to cope with can be reduced.

U.S. Pat. No. 6,680,595 describes a control method and a fastening apparatus for fastening a screw. The fastening apparatus is controlled to output a pulsed increasing torque. The actual torque is determined and the motor is stopped when the actual torque reaches a target value. The pulsed increasing torque is generated by feeding a pulsed current to the electric motor of the fastening apparatus.

Also, U.S. Pat. No. 7,770,658 describes a control method and a fastening apparatus for fastening a screw. The actual torque is determined and the motor is stopped when the actual torque reaches a target value. Further, when the actual torque reaches a set value the torque delivered by the fastening apparatus is reduced. The pulsed torque is generated by feeding a pulsed current to the electric motor of the fastening apparatus.

There is a constant desire to improve the operation of power assisted fastening tools. For example the reaction force transferred to the operator should be as small as possible to improve the working conditions of the operator.

Hence, there exists a need for an improved pulsed fastening method and apparatus to be used in an electric pulse tool.

SUMMARY

It is an object of the invention to provide an improved electric pulse tool where the characteristics of the reaction force is improved so that the electric pulse tool becomes more ergonomic to use.

This object is achieved in accordance with a first aspect of the disclosure by an electric pulse tool, where torque is delivered in pulses on an output shaft of the electric pulse tool. The electric pulse tool comprises an electric motor adapted to drive the output shaft. Whereby the electrical pulse tool for each period is operative to provide a current pulse to the electric motor during a current on time interval. Then pause current feed to the electric motor after the current on time interval until the end of the torque pulse. Thereafter determine the width of the torque pulse. And next continue pausing current feed to the electric motor during a pause interval from the end of the torque pulse, wherein the pause interval is determined based on the width of the torque pulse, such that a wider torque pulse results in a wider pause interval and a narrower torque pulse results in a shorter pause interval.

In accordance with a second aspect the disclosure relates to a method in an electric pulse tool, where torque is delivered in pulses on an output shaft of the electric pulse tool. The electric pulse tool comprises an electric motor adapted to drive the output shaft. Wherein the method for each period comprises the steps of. Provide a current pulse to the electric motor during a current on time interval. Pause current feed to the electric motor after the current on time interval until the end of the torque pulse. Determine the width of the torque pulse. And continue pausing current feed to the electric motor during a pause interval from the end of the torque pulse, wherein the pause interval is determined based on the width of the torque pulse, such that a wider torque pulse results in a wider pause interval and a narrower torque pulse results in a shorter pause interval.

An advantage with exemplary embodiments of the disclosure is that the characteristics of the reaction force is improved so that the electric pulse tool becomes more ergonomic to use.

BRIEF DESCRIPTION OF THE DRAWINGS

The invention will now be described in more detail and with reference to the accompanying drawings, in which.

DETAILED DESCRIPTION

Conventional power tools such as nutrunners or screw drivers are typically provided with sensors, such as angle encoders and/or torque meters, which make it possible to control the quality of a performed work operation, such as the tightening of a joint.

Further, for hand held power tools in particular, it is important both that the reaction force that the operator is subject to is as low as possible and that the time of concluding a specific tightening operation is as short as possible. An operator may conduct many hundreds of tightening operations during a working cycle and it is therefore important that they are both ergonomic for the well-being of the operator and rapid for the productivity at the work station. An ergonomic tightening operation typically implies that the reaction force is as low as possible.

Figure 1:
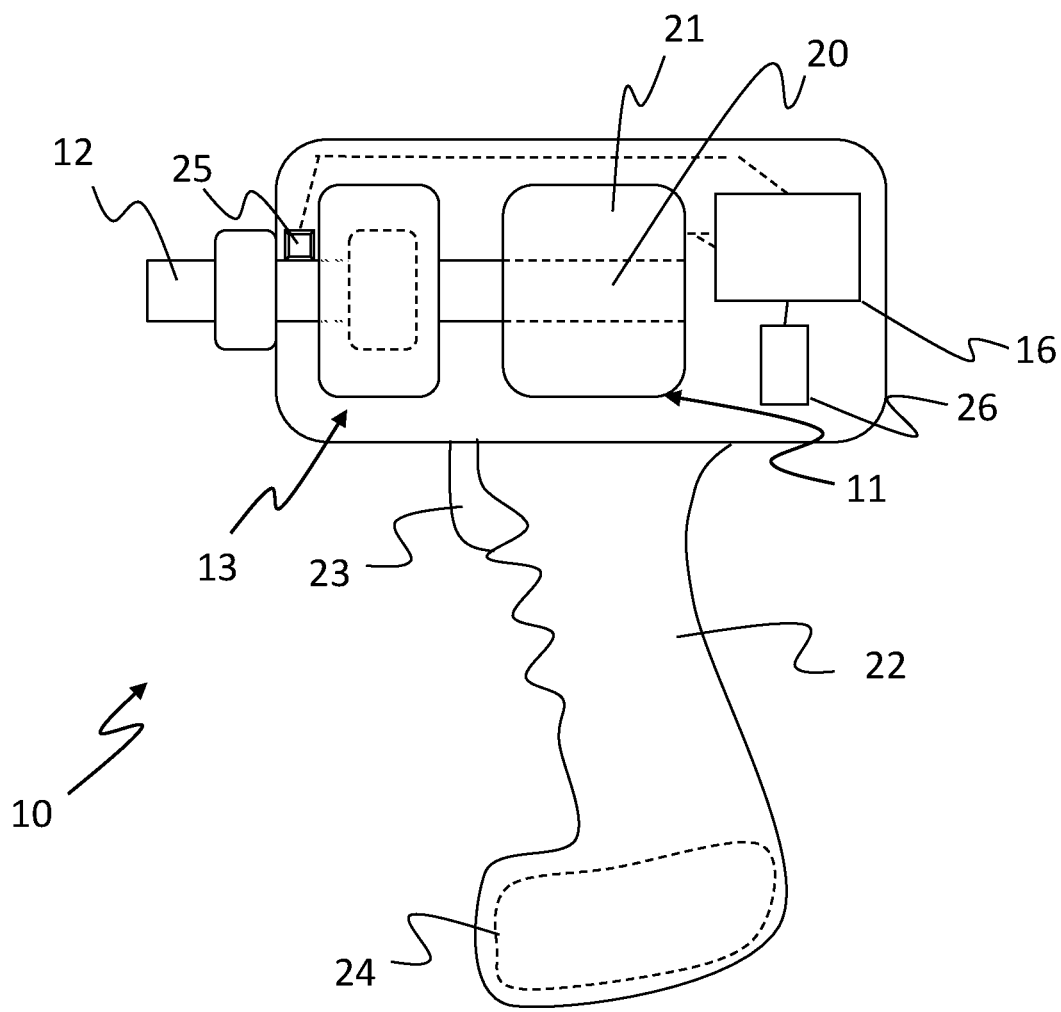
FIG. 1 shows a longitudinal section through a power tool.

FIG. 1 depicts an exemplary embodiment of an electric pulse tool 10 in accordance with an embodiment of the invention. The tool 10 is configured to perform tightening operations where torque is delivered in a series of pulses to tighten screw joints or a similar action involving a rotational action performed by the tool 10. For this purpose the pulse tool comprises an electric motor 11 having a rotor 20 and a stator 21. The electric motor 11 is arranged to be rotated in two opposite rotational directions, clockwise and counter clockwise.

The tool 10 further comprises a handle 22, which is of a pistol type in the shown embodiment. The invention is however not limited to such a configuration but can be applied in any type of electric pulse tool and not limited to the design of FIG. 1. A power supply 24 is connected to the motor 11. In the embodiment shown the power supply is a battery that can be arranged in the lower part of the handle. Other types of power supplies are also envisaged such as an external power supply supplying power via an electrical cable to the tool 10. The tool 10 can further comprise a trigger 23 arranged for manipulation by the operator to control the powering of the electrical motor 11. In some embodiments the tool 10 is connected to an external control unit (not shown). The external control unit can supply the tool 10 with electrical power. The control unit can also be arranged to transmit and receive signals to/from the tool 10 to control the tool. Further, the tool comprises an output shaft 12.

The invention can advantageously be applied in an electric pulse tool where the output shaft 12 is connected to the motor 11 via a gear arrangement 13. The invention is however not limited to such a type of power tool.

The electric pulse tool 10 further comprise a processor 16 arranged to control the electric motor 11. The electric pulse tool 10 also comprises a memory 26 containing instructions executable by the processor 16. The processor 16 is a Central Processing Unit, CPU, microcontroller, Digital Signal Processor, DSP, or any other suitable type of processor capable of executing computer program code. The memory 26 is a Random Access Memory, RAM, a Read Only Memory, ROM, or a persistent storage, e.g. a single or combination of magnetic memory, optical memory, or solid state memory or even remotely mounted memory.

According to one exemplary embodiment of the present disclosure a sensor 25 is arranged to determine if energy is provided on the output shaft. The sensor 25 is in accordance with one embodiment arranged on the output shaft 12. Alternatively the sensor 25 can be located on the gear arrangement. The sensor 25 can however be located on other places in the electric pulse tools. According to one exemplary embodiment of the present disclosure the sensor 25 is a torque sensor 25. According to another exemplary embodiment of the present disclosure the sensor 25 is a position sensor 25.

In electric pulse tools according to prior art current is supplied to the motor intermittently so that the motor generates torque pulses. Thereby less reaction force is exerted on the worker, and the worker can perform the screw fastening work by one hand.

Figure 2:
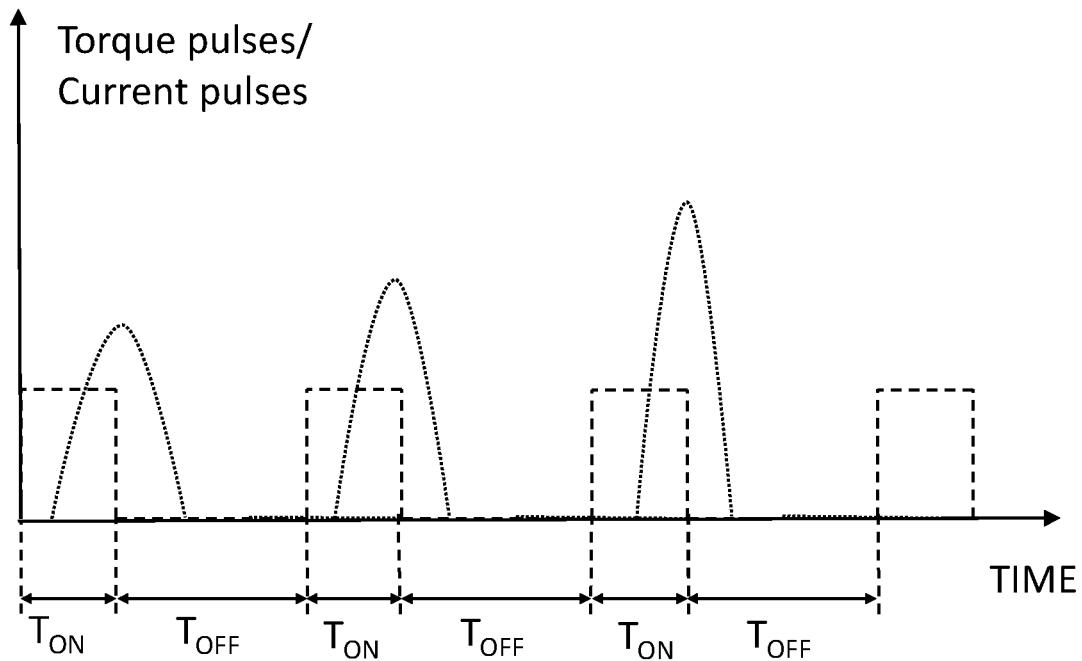
FIG. 2 depicts a diagram of a current pulse sequence according to prior art.

FIG. 2 shows pulse width modulation of an electric motor in a power tool according to prior art. FIG. 2 depicts a diagram of several periods of current pulses (dashed lines) according to prior art. As can be seen in FIG. 2 the on/off ratio is fixed. Meaning that the on-time $T_{ON}$ and off-time $T_{OFF}$ is the same for each period. FIG. 2 also depicts the torque pulses that are delivered in pulses on an output shaft of an electric pulse tool.

Figure 3:
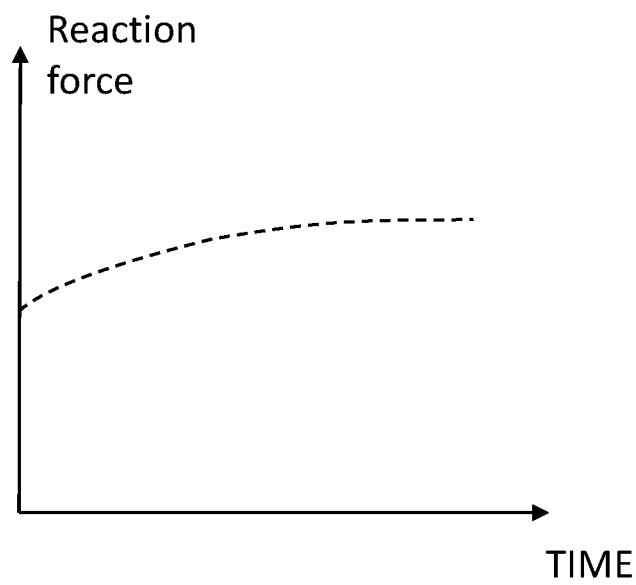
FIG. 3 depicts a diagram of the reaction force from an electric pulse tool according to prior art.

FIG. 3 illustrates the reaction force that an operator experiences when using the electric pulse tool according to prior art. As can be seen from FIG. 3 the reaction force is already high in the beginning of the tightening. This since the reaction force is generated by the torque pulses, not the current pulse. Since the width of the current pulses is constant, but the torque pulses is wider in the beginning, the reaction force is not being built up linearly. Thus there is a large reaction force in the beginning that is experienced as uncomfortable by the operator since the operator is surprised by the high reaction force.

However, the inventor has realised that the characteristics of the reaction force can be improved by changing the characteristics of the current pulses supplied to the electric motor. This can be achieved by also taking into account the characteristics of the torque pulses when providing current pulses to the electric motor.

Figure 4:
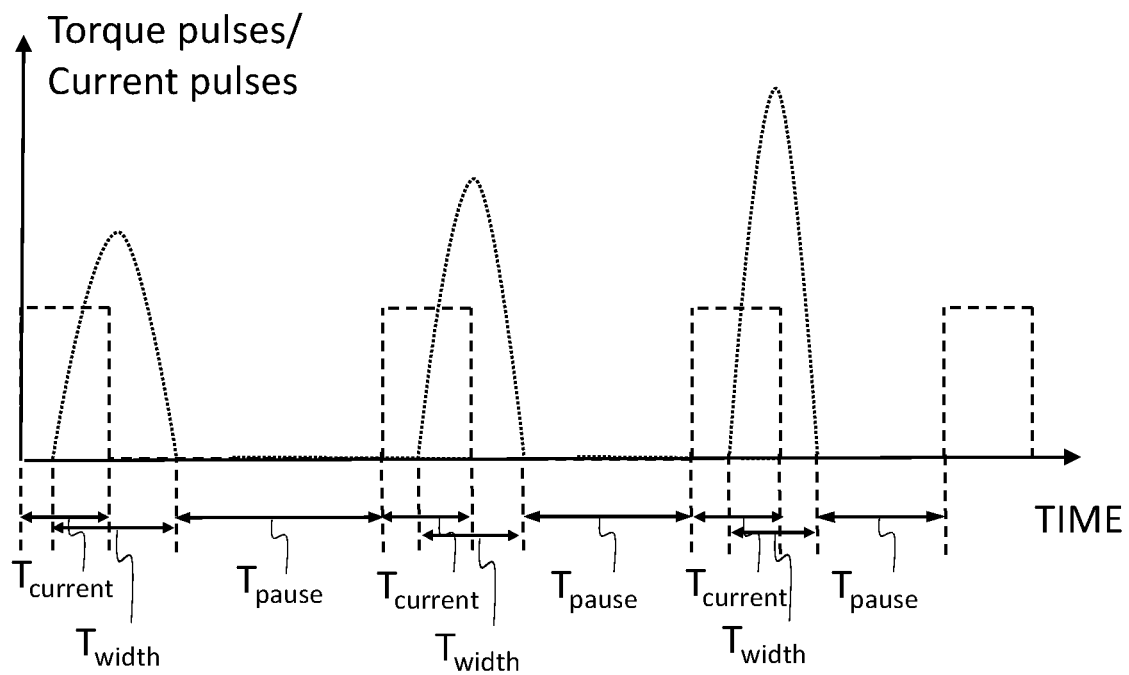
FIG. 4 depicts a diagram of a current pulse sequence according to an exemplary embodiment of the present disclosure.

FIG. 4 shows current pulses supplied to the electric motor according to an exemplary embodiment of the present disclosure. FIG. 4 also shows torque pulses provided by the electric pulse tool 10 according to an exemplary embodiment of the present disclosure.

As can be seen in FIG. 4 the electrical pulse tool 10 for each period is operative to provide a current pulse to the electric motor during a current on time interval $T_{CURRENT}$. Then pause current feed to the electric motor after the current on time interval $T_{CURRENT}$ until the end of the torque pulse. Thereafter the electric pulse tool is operative to determine the width $T_{WIDTH}$ of the torque pulse. Further the electrical pulse tool is operative to continue pausing current feed to the electric motor during a pause interval $T_{pause}$ from the end of the torque pulse, wherein the pause interval $T_{pause}$ is determined based on the width $T_{WIDTH}$ of the torque pulse, such that a wider $T_{WIDTH}$ torque pulse results in a wider pause interval $T_{PAUSE}$ and a narrower $T_{WIDTH}$ torque pulse results in a shorter pause interval $T_{PAUSE}$.

According to an exemplary embodiment the reaction force from the electric pulse tool 10 depends on the torque amplitude and the relationship between the width $T_{WIDTH}$ off the torque pulses and the off time of the torque pulses. In the exemplary embodiment illustrated in FIG. 4 the off time for the torque pulses is $T_{CURRENT}$ plus $T_{PAUSE}$. At the beginning of a tightening the electric pulse tool tighten the screw during longer time per pulse than at the end, which means that the width $T_{WIDTH}$ of the torque pulses are wider. The pause intervals $T_{pause}$ according to the invention are therefore determined to be wider in the beginning of the tightening in order to give a smoother built up of the reaction force.

Figure 5:
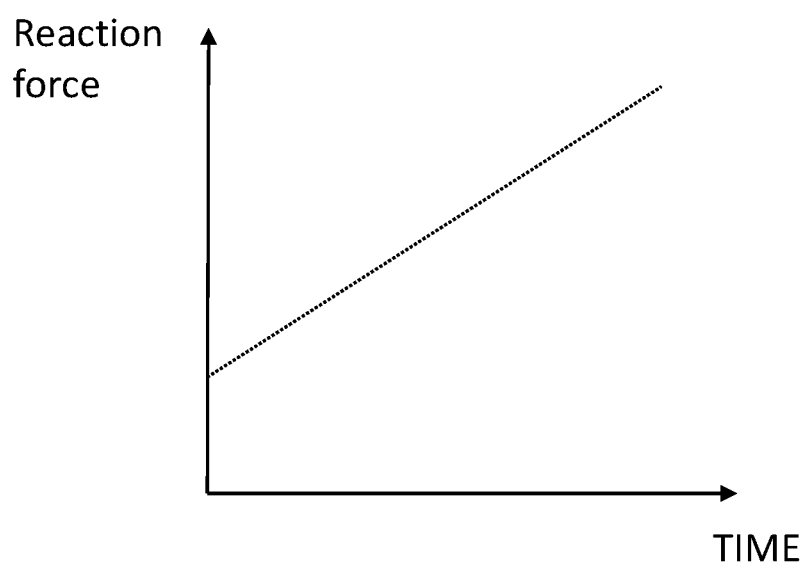
FIG. 5 depicts a diagram of the reaction force from an electric pulse tool according to an exemplary embodiment of the present disclosure.

FIG. 5 illustrates the reaction force that an operator experiences when using the tool according to an exemplary embodiment of the present disclosure. As can be seen from FIG. 5 the reaction force is low in the beginning of the tightening. The reaction force is also built up more linearly compared to prior art electric pulse tools. This since the reaction force is generated by the relation between the on time of the torque pulses and the off time of the torque pulses for each period. Since the pause interval $T_{PAUSE}$ is determined based on the width $T_{WIDTH}$ of the torque pulses, such that a wider torque pulse $T_{WIDTH}$ results in a wider pause interval and a narrower torque pulse $T_{WIDTH}$ results in a shorter pause interval $T_{PAUSE}$, the reaction force is small in the beginning and built up more linearly. Thus this results in a small reaction force in the beginning that is experienced more comfortable by the operator since the operator is not surprised by the high reaction force.

In another exemplary embodiment of the electric pulse tool according to the present disclosure the width $T_{WIDTH}$ of the torque pulse is determined based on the interval from a first point in time when the electric pulse tool starts to transfer energy on the output shaft to a second point in time when the electric pulse tool stops to transfer energy on the output shaft.

In an exemplary embodiment the electric pulse tool comprises a torque sensor and if energy is transferred on the output shaft is determined based on the determined torque on the output shaft.

According to one exemplary embodiment of the electric pulse tool 10 the output shaft is determined to stop transferring energy when the determined torque reaches essentially zero. According to one exemplary embodiment of the electric pulse tool 10 the output shaft is determined to start transferring energy when the determined torque reaches essentially above zero. According to another exemplary embodiment the electric pulse tool the sensor is a position sensor and if energy is transferred on the output shaft is determined based on the determined position change of the output shaft. According to one exemplary embodiment of the electric pulse tool 10 the output shaft is determined stop transferring energy when the speed determined by the position sensor reaches essentially zero.

According to one exemplary embodiment of the electric pulse tool 10 the output shaft is determined to start transferring energy when the determined speed determined by the position sensor reaches essentially above zero.

In an exemplary embodiment of the electric pulse tool the pause interval $T_{PAUSE}$ is a predetermined factor of the width $T_{WIDTH}$ of the torque pulse minus the current on time interval $T_{CURRENT}$.

$$T_{PAUSE} = (\text{factor} * T_{WIDTH}) - T_{CURRENT}$$

An advantage with this exemplary embodiment is that the operator can choose how much reaction force that the electric pulse tool delivers to the hand by choosing the predetermined factor. The experienced reaction force will be less with a higher factor.

In an exemplary embodiment of the electric pulse tool 10 according to the present disclosure the factor is received from e.g. a tool controller. The factor may have been entered to the controller via a user interface of the controller.

In an exemplary embodiment of the electric pulse tool 10 according to the present disclosure the parameter value is entered to the electric pulse tool via a user interface of the controller.

In yet another exemplary embodiment of the electric pulse tool according to the present disclosure the electrical pulse tool is further operative to repeat the periods until a parameter value associated with the tightening of a screw joint has been reached. In an exemplary embodiment of the electric pulse tool according to the present disclosure the parameter value associated with the tightening of a screw joint is torque. In yet another exemplary embodiment of the electric pulse tool according to the present disclosure the parameter value associated with the tightening of a screw joint is angle.

The present disclosure also relates to a computer-readable storage medium, having stored there on a computer program which, when run in an electrical pulse tool 10, causes the electrical pulse tool 10 to perform the method as described above.

According to one exemplary embodiment, when the above-mentioned computer program code is run in the processor 16 of the electric pulse tool 10 it causes the electric pulse tool 10 to provide a current pulse to said pulse width modulated electric motor.

Thus according to one exemplary embodiment the electric pulse tool 10 comprises the processor 16 and the memory 26 containing instructions executable by the processor 16, whereby the electrical pulse tool 10 for each period is operative to perform the method according to any of the above described exemplary embodiments.

Figure 6:
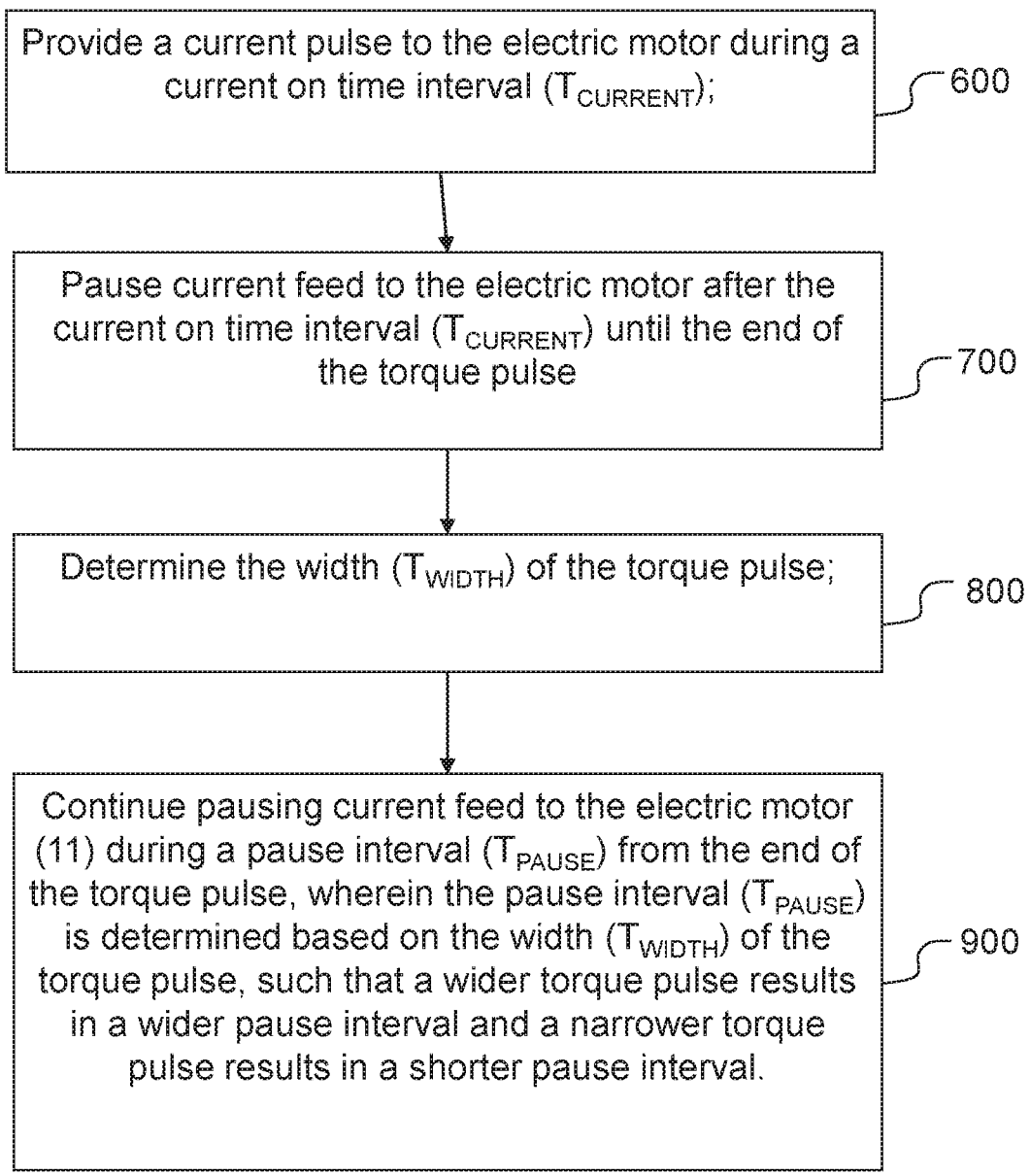
FIG. 6 shows a flow chart illustrating a method according to an exemplary embodiment of the present disclosure.

FIG. 6 illustrates the steps in a method, performed in an electric pulse tool 10 for performing tightening operations according to the above described exemplary embodiments. As in the above described exemplary embodiments, torque is delivered in pulses to tighten a screw joint. Also, as above the electric pulse tool 10 comprises an electric motor adapted to drive the output shaft 12.

In a first step 600 the electric pulse tool provides a current pulse to the electric motor during a current on time interval. In a next step 700 current feed to the electric motor is paused after the current on time interval until the end of the torque pulse. Next in step 800 is the width of the torque pulse determined. In the next step 900 current feed is continued to be paused to the electric motor during a pause interval from the end of the torque pulse, wherein the pause interval is determined based on the width of the torque pulse, such that a wider torque pulse results in a wider pause interval and a narrower torque pulse results in a shorter pause interval.

According to one exemplary embodiment of the method, the width of the torque pulse is determined based on the interval from a first point in time when the electric pulse tool starts to transfer energy on the output shaft to a second point in time when the electric pulse tool stops to transfer energy on the output shaft.

In another exemplary embodiment of the method the pause interval $T_{PAUSE}$ is a predetermined factor of the width $T_{WIDTH}$ of the torque pulse minus the current on time interval $T_{CURRENT}$.

$$T_{PAUSE} = (\text{factor} * T_{WIDTH}) - T_{CURRENT}$$

According to another exemplary embodiment, the method comprises determining if energy is transferred on the output shaft based on the determined torque on the output shaft. In an exemplary embodiment of the method, the output shaft is determined to stop transferring energy when the determined torque reaches essentially zero.

According to another exemplary embodiment, the method comprises determining if energy is transferred on the output shaft based on the determined position change of the output shaft. According to another exemplary embodiment, the electrical pulse tool 10 is operative to repeat the periods until a parameter value associated with the tightening of a screw joint has been reached.

According to an exemplary embodiment the parameter value associated with the tightening of a screw joint is torque. According to an exemplary embodiment the parameter value associated with the tightening of a screw joint is angle.

In the above the pulsed energy supplied to the motor is described as a controlled pulsed current. It is however envisaged that the pulsed energy is controlled based on some other parameter other than current. The term (current) pulse as used herein therefore also includes other types of energy pulses other than current controlled pulses, such as motor speed control pulses, voltage controlled pulses or the like.

The invention claimed is:

1. An electric pulse tool configured to deliver torque in pulses on an output shaft thereof, the electric pulse tool comprising:
   an electric motor configured to drive the output shaft; and
   a processor and a memory storing instructions that are executable by the processor to control the electric pulse tool to perform operations including, for each of a plurality of periods:

providing a current pulse to the electric motor during a current-on time interval;

pausing a current feed to the electric motor after the current-on time interval until an end of a torque pulse generated due to the current pulse;

determining a width of the torque pulse;

determining a width of a pause interval, which is an interval from the end of the torque pulse to a beginning of a next current pulse, such that a wider torque pulse results in a wider pause interval and a narrower torque pulse results in a shorter pause interval; and continuing pausing the current feed to the electric motor during the pause interval.

2. The electric pulse tool according to claim 1, wherein the width of the torque pulse is determined based on an interval from a first point in time when the electric pulse tool starts to transfer energy on the output shaft to a second point in time when the electric pulse tool stops transferring energy on the output shaft.

3. The electric pulse tool according to claim 2, further comprising:

a torque sensor, wherein the transfer of energy on the output shaft is determined based on a determined torque on the output shaft.

4. The electric pulse tool according to claim 2, further comprising:

a position sensor, wherein the transfer of energy on the output shaft is determined based on a determined position change of the output shaft.

5. The electric pulse tool according to claim 3, wherein the transfer of energy on the output shaft is determined to have stopped when the determined torque reaches essentially zero.

6. The electric pulse tool according to claim 1, wherein the pause interval is a predetermined factor of the width of the torque pulse minus the current-on time interval.

7. The electric pulse tool according to claim 1, wherein the processor executing the instructions controls the electric pulse tool to repeat said periods until a parameter value associated with tightening of a screw joint has been reached.

8. The electric pulse tool according to claim 7, wherein the parameter value associated with the tightening of the screw joint is torque.

9. The electric pulse tool according to claim 7, wherein the parameter value associated with the tightening of the screw joint is angle.

10. The electric pulse tool according to claim 1, wherein each of the periods is a period from a beginning of the current pulse to the beginning of the next current pulse.

11. A method for controlling the electric pulse tool according to claim 1, the method comprising, for each of the plurality of periods:

providing the current pulse to the electric motor during the current-on time interval;

pausing the current feed to the electric motor after the current-on time interval until the end of the torque pulse generated due to the current pulse;

determining the width of the torque pulse;

determining the width of the pause interval, which is the interval from the end of the torque pulse to the beginning of the next current pulse, such that a wider torque pulse results in a wider pause interval and a narrower torque pulse results in a shorter pause interval; and continuing pausing the current feed to the electric motor during the pause interval.

12. The method according to claim 11, wherein the width of the torque pulse is determined based on an interval from a first point in time when the electric pulse tool starts to transfer energy on the output shaft to a second point in time when the electric pulse tool stops transferring energy on the output shaft.

13. The method according to claim 12, further comprising determining if energy is transferred on the output shaft based on a determined torque on the output shaft.

14. The method according to claim 12, further comprising determining if energy is transferred on the output shaft based on a determined position change of the output shaft.

15. The method according to claim 13, wherein the transfer of energy on the output shaft is determined to have stopped when the determined torque reaches essentially zero.

16. The method according to claim 11, wherein the pause interval is a predetermined factor of the width of the torque pulse minus the current-on time interval.

17. A non-transitory computer-readable storage medium, having stored thereon a program executable by a processor of an electric pulse tool, the program being executable by the processor to control the electric pulse tool to perform the method according to claim 11.

* * * * *